(12) United States Patent
Ono

(10) Patent No.: US 8,612,096 B2
(45) Date of Patent: Dec. 17, 2013

(54) STEERING SYSTEM

(75) Inventor: Kimiaki Ono, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 36 days.

(21) Appl. No.: 13/512,408

(22) PCT Filed: Nov. 30, 2010

(86) PCT No.: PCT/IB2010/003059
§ 371 (c)(1),
(2), (4) Date: May 29, 2012

(87) PCT Pub. No.: WO2011/067650
PCT Pub. Date: Jun. 9, 2011

(65) Prior Publication Data
US 2012/0245799 A1    Sep. 27, 2012

(30) Foreign Application Priority Data

Dec. 1, 2009 (JP) .............................. 2009-273102

(51) Int. Cl.
| A01B 69/00 | (2006.01) |
| B62D 6/00 | (2006.01) |
| B62D 11/00 | (2006.01) |
| B62D 12/00 | (2006.01) |
| B63G 8/20 | (2006.01) |
| B63H 25/04 | (2006.01) |
| G05D 1/00 | (2006.01) |
| G06F 7/00 | (2006.01) |
| G06F 17/00 | (2006.01) |
| G06F 19/00 | (2011.01) |

(52) U.S. Cl.
USPC .............................................. 701/42; 701/41

(58) Field of Classification Search
USPC .......... 701/42, 58, 54, 61, 51, 53; 477/3, 115, 477/46, 43, 109
See application file for complete search history.

(56) References Cited

U.S. PATENT DOCUMENTS 6,913,109 B2 * 7/2005 Kodama et al. ............... 180/446
7,042,179 B2 * 5/2006 Mukai et al. .................. 318/432

(Continued)

FOREIGN PATENT DOCUMENTS

| EP | 1 384 648 A2 | 1/2004 |
| EP | 1 650 103 A2 | 4/2006 |
| JP | 11-301507 | 11/1999 |
| JP | 2011116172 A | * 6/2011 |

OTHER PUBLICATIONS

International Search Report in International Application No. PCT/IB2010/003059; Mailing Date: Mar. 30, 2011.

(Continued)

*Primary Examiner* — Thomas Black
*Assistant Examiner* — Robert Payne
(74) *Attorney, Agent, or Firm* — Finnegan, Henderson, Farabow, Garrett & Dunner, LLP

(57) ABSTRACT

A steering system (100) includes: a variable transmission ratio mechanism (19); a limiting mechanism (20) and control means (30). The variable transmission ratio mechanism (19) varies a transmission ratio between a steering angle and a steered angle. The limiting mechanism (20) suppresses a variation in the transmission ratio of the variable transmission ratio mechanism (19). The control means (30) controls the variable transmission ratio mechanism (19). For example, the variable transmission ratio mechanism (19) uses a motor (40) to vary the transmission ratio, and the control means (30) controls a magnitude of current supplied to the motor to control the variable transmission ratio mechanism (19). The control means decreases a rate of contribution of I operation in feedback control over the variable transmission ratio mechanism (19) when the limiting mechanism (20) is operated as compared with a rate of contribution of I operation when the limiting mechanism (20) is not operated.

11 Claims, 4 Drawing Sheets

(56) References Cited

U.S. PATENT DOCUMENTS

| | | | |
|---|---|---|---|
| 7,049,773 B2 * | 5/2006 | Miyazawa et al. | 318/432 |
| 7,073,621 B2 * | 7/2006 | Koibuchi et al. | 180/421 |
| 7,091,684 B2 * | 8/2006 | Kobayashi et al. | 318/432 |
| 7,187,153 B2 * | 3/2007 | Imagawa et al. | 318/638 |
| 7,363,135 B2 * | 4/2008 | Lin et al. | 701/42 |
| 7,913,803 B2 * | 3/2011 | Hidaka | 180/446 |

OTHER PUBLICATIONS

Written Opinion of the International Searching Authority in International Application No. PCT/IB2010/003059; Mailing Date: Mar. 30, 2011.

* cited by examiner

STEERING SYSTEM

CROSS-REFERENCE TO RELATED APPLICATIONS

This application is a national phase application of International Application No. PCT/IB2010/003059, filed Nov. 30, 2010, and claims the priority of Japanese Application No. 2009-273102, filed Dec. 1, 2009, the content of both of which is incorporated herein by reference.

BACKGROUND OF THE INVENTION

1. Field of the Invention

The invention relates to a steering system that includes a variable transmission ratio mechanism that is able to vary a transmission ratio between a steering angle and a steered angle.

2. Description of the Related Art

A technique of this type is described, for example, in Japanese Patent Application Publication No. 11-301507 (JP-A-11-301507). JP-A-11-301507 describes a vehicle steering limiting device. The vehicle steering limiting device includes a limiting mechanism that limits operation of a variable transmission ratio mechanism on the basis of a steering angle and a steered angle.

Incidentally, the variable transmission ratio mechanism, for example, includes a reduction mechanism, such as a planetary gear mechanism, and a motor coupled to a gear of the reduction mechanism, and controls the magnitude of current supplied to the motor to control the transmission ratio. Here, it is conceivable that feedback (FB) control is executed in order to increase the accuracy of control over the variable transmission ratio mechanism. However, when feedback control, such as PID control in which the rate of contribution of I operation is relatively large, is executed, redundant current is supplied to the motor during operation of the limiting mechanism, and there is a possibility that it is difficult to efficiently control the variable transmission ratio mechanism.

SUMMARY OF INVENTION

The invention provides a steering system that is able to efficiently control a variable transmission ratio mechanism.

An aspect of the invention provides a steering system. The steering system is equipped for a vehicle, and has a variable transmission ratio mechanism that varies a transmission ratio between a steering angle and a steered angle. The steering system includes: a limiting mechanism that varies the transmission ratio of the variable transmission ratio mechanism; and control means that executes feedback control over the variable transmission ratio mechanism. When the control means executes feedback control when the limiting mechanism is operated, the control means decreases a rate of contribution of I operation in the feedback control as compared with a rate of contribution of I operation in the feedback control when the limiting mechanism is not operated.

The steering system includes a variable transmission ratio mechanism, a limiting mechanism and control means. The variable transmission ratio mechanism varies a transmission ratio between a steering angle and a steered angle. The limiting mechanism suppresses a variation in the transmission ratio of the variable transmission ratio mechanism. The control means executes feedback control over the variable transmission ratio mechanism. When the control means executes feedback control when the limiting mechanism is operated, the control means decreases a rate of contribution of I operation in the feedback control as compared with a rate of contribution of I operation in the feedback control when the limiting mechanism is not operated. By so doing, the variable transmission ratio mechanism may be efficiently controlled when the limiting mechanism is operated.

The variable transmission ratio mechanism may include a motor that varies the transmission ratio, and the control means may control a magnitude of current supplied to the motor to control the variable transmission ratio mechanism. With the above configuration, redundant current flowing through the motor may be suppressed when the limiting mechanism is operated, and the variable transmission ratio mechanism may be efficiently controlled.

The control means may set the feedback control to PD control when the limiting mechanism is operated. By so doing, I operation is not executed when the limiting mechanism is operated, so the variable transmission ratio mechanism may be efficiently controlled.

The control means may set the feedback control to PID control when the limiting mechanism is not operated. By so doing, the accuracy of control over the variable transmission ratio mechanism may be improved when the limiting mechanism is not operated.

The control means may set the feedback control to PD control when the control means verifies through operation of the variable transmission ratio mechanism whether the limiting mechanism is operated or not operated. By so doing, when the control means verifies whether the limiting mechanism is operated or not operated, it is possible to efficiently control the variable transmission ratio mechanism.

The variable transmission ratio mechanism may vary the transmission ratio through a relative displacement between the steering angle and the steered angle, and the limiting mechanism may limit an amount of the relative displacement in the variable transmission ratio mechanism to vary the transmission ratio.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Figure 1:
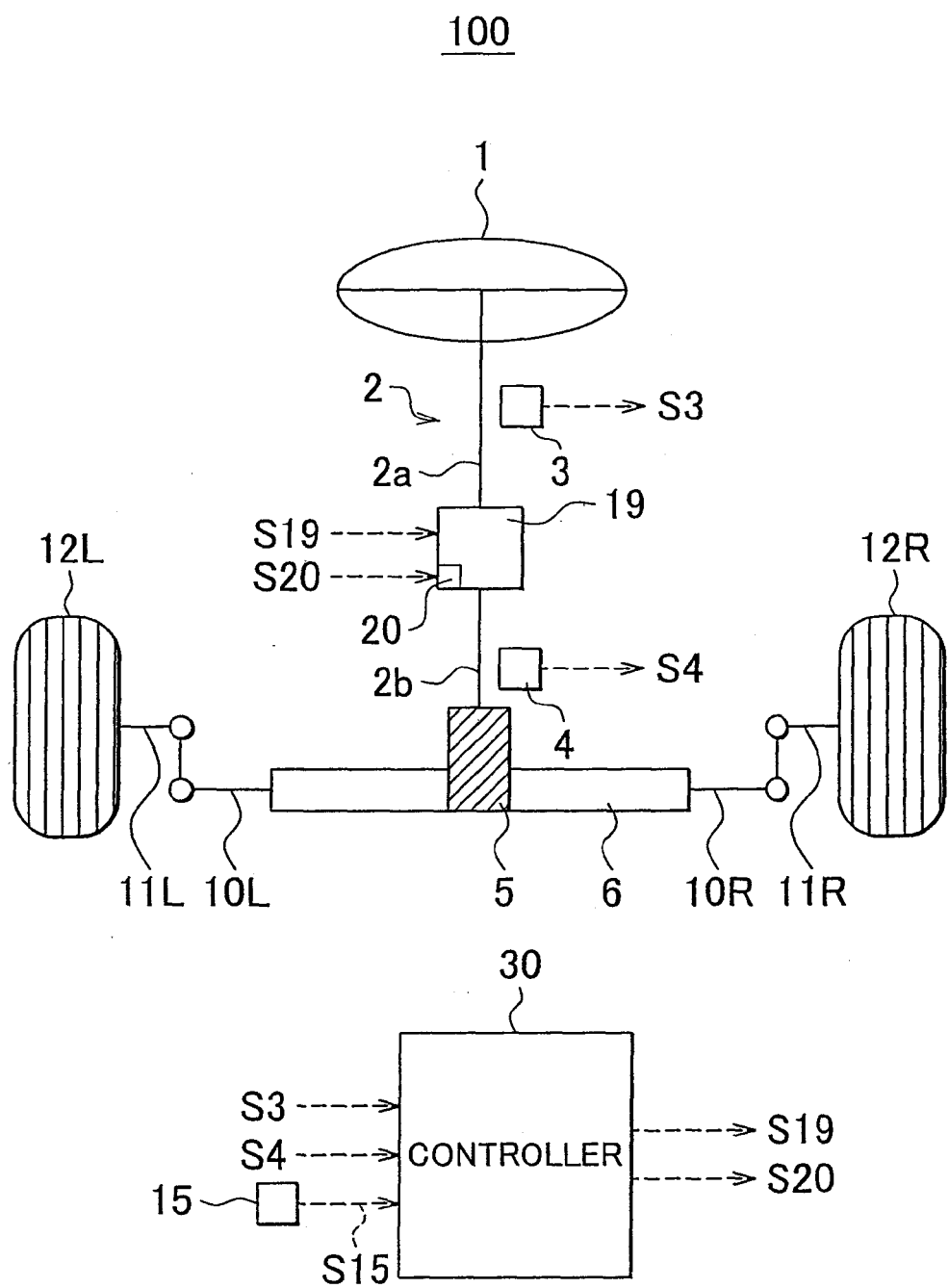
FIG. 1 is a schematic configuration diagram of a steering control system to which a steering system according to an embodiment is applied.

Hereinafter, an embodiment of the invention will be described with reference to the accompanying drawings.
System Configuration First, the overall configuration of a system (hereinafter, referred to as "steering control system") 100 to which a steering system according to the present embodiment is applied will be described. FIG. 1 is a schematic diagram that shows the configuration of the steering control system 100.

The steering control system 100 mainly includes a steering wheel 1, a steering shaft 2, a steering angle sensor 3, a steered angle sensor 4, a pinion 5, a steering rack 6, tie rods 10R and 10L, knuckle arms 11R and 11L, wheels 12R and 12L, a vehicle speed sensor 15 and a controller 30. Note that, in the following description, "R" and "L" suffixed to the reference numerals of the tie rods 10R and 10L, knuckle arms 11R and 11L and wheels 12R and 12L are omitted when these are not distinguished from each other.

The steering control system 100 is a system that is equipped for a vehicle and that carries out control for steering the wheels 12 (steered wheels) in response to operation of the steering wheel 1, or the like.

The steering wheel 1 is operated by a driver in order to, for example, turn the vehicle. The steering wheel 1 is connected to the pinion 5 via the steering shaft 2. The steering shaft 2 is mainly provided with the steering angle sensor 3 and the steered angle sensor 4.

The pinion 5 is configured to be rotatable with rotation of the steering shaft 2. The steering rack 6 is configured to be movable with rotation of the pinion 5. The knuckle arms 11 are coupled to the steering rack 6 via the respective tie rods 10, and the wheels 12 are respectively coupled to the knuckle arms 11. In this case, the tie rods 10 and the knuckle arms 11 are operated by the steering rack 6 to thereby steer the wheels 12 coupled to the knuckle arms 11.

Various sensors provided in the steering control system 100 function as follows. The steering angle sensor 3 detects a steering angle corresponding to driver's operation of the steering wheel 1, and supplies a detection signal S3 corresponding to the detected steering angle to the controller 30. The steered angle sensor 4 detects a steered angle of the wheels 12, and supplies a detection signal S4 corresponding to the detected steered angle to the controller 30. The vehicle speed sensor 15 detects a vehicle speed (for example, detects a wheel speed), and supplies a detection signal S15 corresponding to the detected vehicle speed to the controller 30.

A variable transmission ratio mechanism 19 is able to increase (or decrease) the speed of rotation of the steering shaft 2, input to the pinion 5. That is, the variable transmission ratio mechanism 19 varies the transmission ratio between the steering angle and the steered angle. The variable transmission ratio mechanism 19 may be, for example, a variable gear ratio steering. Specifically, the variable transmission ratio mechanism 19 includes a motor, and the like, and couples an input shaft 2a of the steering shaft 2 to an output shaft 2b of the steering shaft 2 at a variable gear portion. Hereinafter, the "transmission ratio" indicates the ratio of the rotation of the output shaft 2b to the rotation of the input shaft 2a.

In addition, a lock mechanism 20 is installed in the variable transmission ratio mechanism 19. As will be described in detail with reference to FIG. 2A and FIG. 2B, the lock mechanism 20 is able to prohibit a variation in the transmission ratio of the variable transmission ratio mechanism 19. That is, the variable transmission ratio mechanism 19 cannot vary the transmission ratio when the lock mechanism 20 is operated. The lock mechanism 20 functions as a limiting mechanism according to the aspect of the invention.

The controller 30 is formed of a CPU, a ROM, a RAM, an A/D converter, and the like. On the basis of the detection signals S3, S4, S15, and the like, supplied from the above described various sensors, the controller 30 supplies a control signal S19 to the variable transmission ratio mechanism 19 to control the variable transmission ratio mechanism and supplies a control signal S20 to the lock mechanism 20 to control the lock mechanism 20. Note that the controller 30 may be implemented by an ECU that executes control inside the vehicle. The controller 30 functions as control means according to the aspect of the invention.

Here, the configuration of the variable transmission ratio mechanism 19 will be described with reference to FIG. 2A and FIG. 2B.

Figure 2A:
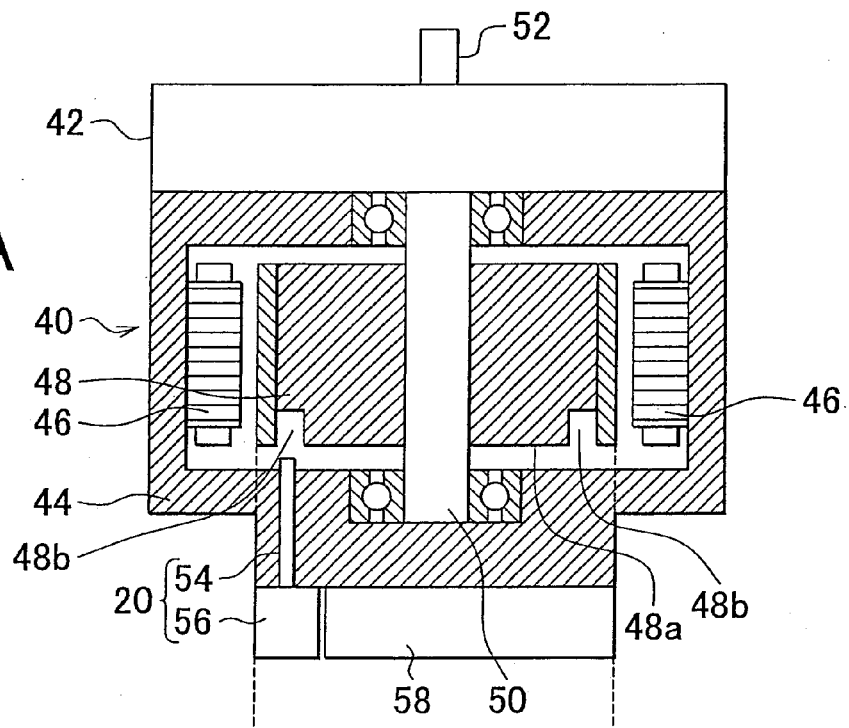
FIG. 2A and FIG. 2B are configuration diagrams of a variable transmission ratio mechanism.
Figure 2B:
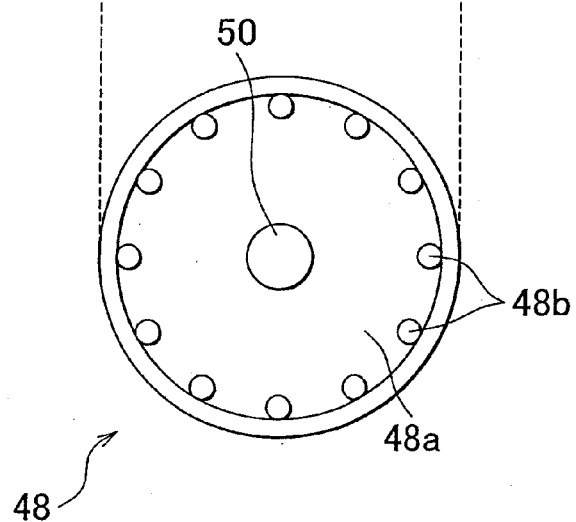

FIG. 2A shows the sectional view of the variable transmission ratio mechanism 19. FIG. 2B shows the end view of a rotor of the motor in the variable transmission ratio mechanism 19. As shown in FIG. 2A, the variable transmission ratio mechanism 19 includes the motor 40 and a speed reducer 42. The motor 40 has a stator 46 and the rotor 48. The stator 46 is fixed to the inside of a motor housing 44. The speed reducer 42 is, for example, the one that uses a planetary gear mechanism. For example, in the speed reducer 42, a sun gear (not shown) is connected to a rotary shaft 50 that rotates together with the rotor 48, and a carrier 52 extending toward an opposite side of the rotary shaft 50 is connected to a lower end of the input shaft 2a of the steering shaft 2. An upper end of the output shaft 2b of the steering shaft 2 is connected to the motor housing 44 adjacent to the motor 40. The control signal S19 is supplied from the controller 30 to the motor 40 via a spiral cable 58.

In addition, the lock mechanism 20 is provided on an outer lower surface (surface adjacent to the output shaft 2b) of the motor housing 44. The lock mechanism 20 has a solenoid actuator 56 and a slide pin 54. In addition, as shown in FIG. 2B, a plurality of pin holes 48b are provided at the lower surface 48a of the rotor 48 along the circumferential direction at equiangular intervals. The slide pin 54 is inserted into any one of the pin holes 48b. The solenoid actuator 56 is operated by the control signal S20 from the controller 30. As the solenoid actuator 56 operates, the slide pin 54 is displaced in a direction parallel to the axis of the rotary shaft 50. By so doing, the slide pin 54 is inserted into any one of the pin holes 48b to lock the rotation of the rotor 48 to thereby prohibit a variation in the transmission ratio in the variable transmission ratio mechanism 19.

Control Method

Next, a control method for the steering control system according to the present embodiment will be described.

The controller 30 obtains a steering angle on the basis of the detection signal S3 supplied from the steering angle sensor 3, and obtains a steered angle on the basis of the detection signal S4 supplied from the steered angle sensor 4. In addition, the controller 30 obtains a vehicle speed on the basis of the detection signal S15 supplied from the vehicle speed sensor 15.

The controller 30 computes the transmission ratio on the basis of the vehicle speed. Here, the transmission ratio is computed using a map of the transmission ratio with respect to the vehicle speed. Then, the controller 30 obtains a target steered angle on the basis of the transmission ratio obtained through the computation. Specifically, the controller 30 multiplies the transmission ratio by the steering angle to obtain a target steered angle. Hereinafter, in order to be distinguished from the target steered angle, an actual steered angle obtained on the basis of the detection signal S4 supplied from the steered angle sensor 4 is referred to as "actual steered angle". The controller 30 executes feedback control over the variable transmission ratio mechanism 19 on the basis of the detection signal S4 supplied from the steered angle sensor 4 so that the actual steered angle coincides with the target steered angle. Specifically, in order to increase the trackability of the actual steered angle to the target steered angle, the controller 30 executes, for example, PID control, including I operation, over the motor 40 of the variable transmission ratio mechanism 19. Here, the PID control means control that combines P operation, I operation and D operation. The P operation means operation that varies an input value as a linear function of a difference between an output value and a target value. The I operation means operation that varies an input value in proportion to integration of the difference. The D operation means operation that varies an input value in proportion to differential of the difference.

Here, for example, when the difference between the actual steered angle and the target steered angle is larger than or equal to a predetermined angle or when a current supplied to the motor 40 is larger than or equal to a predetermined current value, the controller 30 operates the lock mechanism 20 to lock the rotor 48 of the variable transmission ratio mechanism 19. As the slide pin 54 is inserted into any one of the pin holes 48b to lock the rotor 48, the rotor 48 is serially coupled to the motor housing 44. That is, in the steering shaft 2, a relative displacement between the input shaft 2a and the output shaft 2b is prohibited, and the steering wheel 1 is directly coupled to the steered wheels 12. By so doing, even when there is an excessive input from the side of the steering wheel 1 or even when there is an excessive reverse input from the steered wheels 12, it is possible to reduce occurrence of a deviation in phase due to these excessive inputs. Here, the predetermined angle and the predetermined current value are appropriate values obtained through an experiment, or the like. Note that, in the following description, control for controlling the lock mechanism 20 to inset the slide pin 54 into any one of the pin holes 48b to thereby lock the rotor 48 is termed "rotor lock control", and control for releasing lock of the rotor 48 by drawing the slide pin 54 out of the pin hole 48b is termed "rotor release control".

Incidentally, when PID control is executed over the motor 40 of the variable transmission ratio mechanism 19 in a state where the rotor 48 of the variable transmission ratio mechanism 19 is locked or lock of the rotor 48 is not completely released, a difference between the actual steered angle and the target steered angle is large, so redundant current flows through the motor 40 because of I operation of PID control, so it is difficult to efficiently control the variable transmission ratio mechanism 19.

Then, in the present embodiment, when the lock mechanism 20 is operated, the controller 30 decreases the rate of contribution of I operation in feedback control over the variable transmission ratio mechanism 19 as compared with the rate of contribution of I operation in feedback control when the lock mechanism 20 is not operated. Note that, here, a time when the lock mechanism 20 is operated not only includes a period during which the rotor 48 is locked but also includes a period during which rotor lock control is executed and a period during which rotor release control is executed.

Specifically, when the controller 30 executes feedback control over the variable transmission ratio mechanism 19 when the lock mechanism 20 is operated, the controller 30 executes PD control that does not execute I operation. That is, feedback control is switched between when the lock mechanism 20 is operated and when the lock mechanism 20 is not operated. Here, the PD control is control that combines P operation and D operation. In the following description, feedback control switching process for each of when rotor release control is executed and when rotor lock control is executed will be described.

Figure 3:
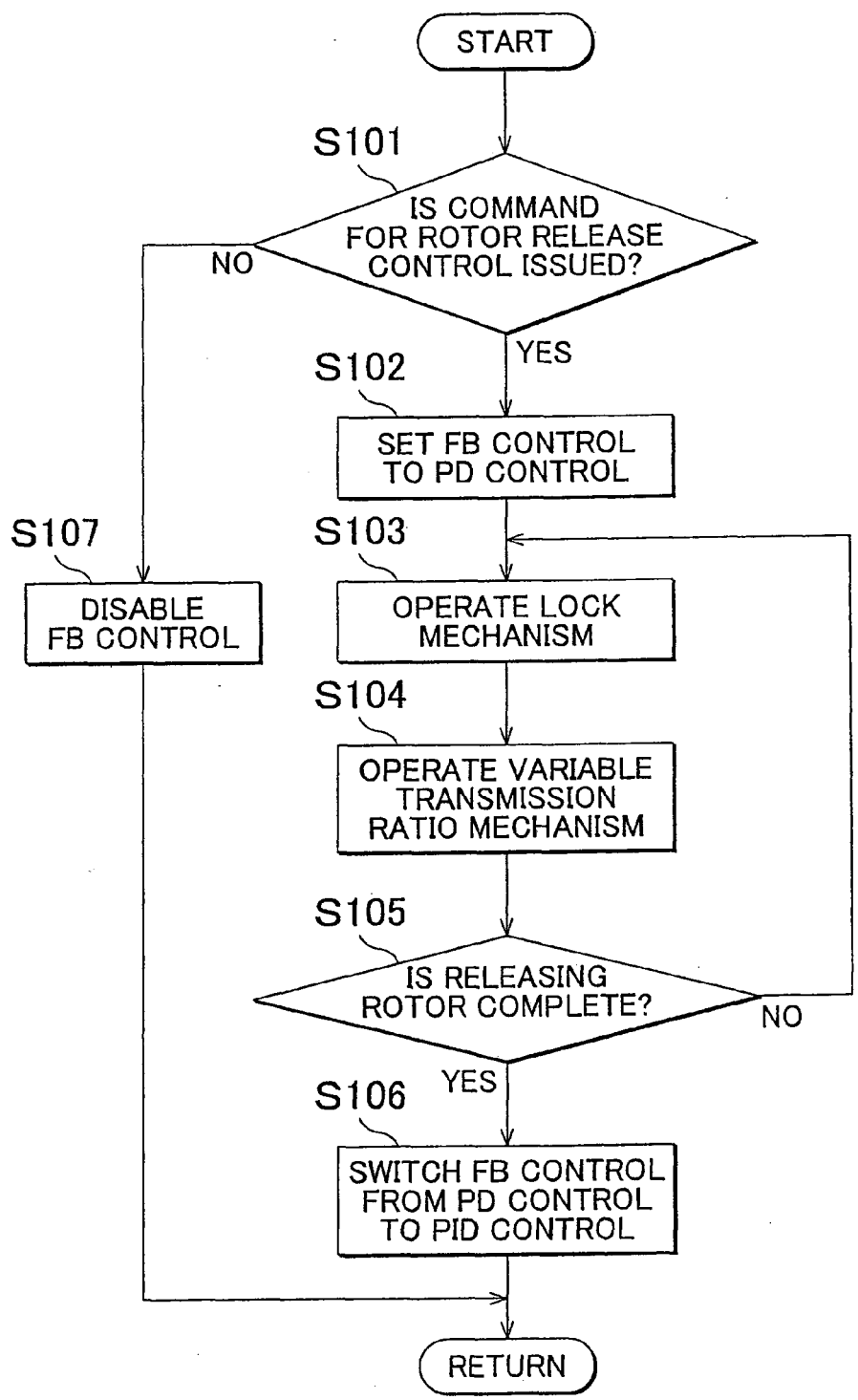
FIG. 3 is a flowchart that shows release control over a lock mechanism.

First, the feedback control switching process when rotor release control is executed will be specifically described using the flowchart shown in FIG. 3.

First, in step S101, the rotor 48 of the variable transmission ratio mechanism 19 is locked. Here, the controller 30 determines whether to issue a command for rotor release control to the lock mechanism 20. For example, when the difference between the actual steered angle and the target steered angle is larger than or equal to a predetermined angle or when a current supplied to the motor 40 is larger than or equal to a predetermined current value, the controller 30 does not issue a command for rotor release control to the lock mechanism 20. On the other hand, for example, when the difference between the actual steered angle and the target steered angle is smaller than the predetermined angle and when a current supplied to the motor 40 is smaller than the predetermined current value, the controller 30 issues a command for rotor release control to the lock mechanism 20.

When the controller 30 determines not to issue a command for rotor release control to the lock mechanism 20 (No in step S101), the controller 30 proceeds to step S107 and then disables feedback control, after which the controller 30 ends the control process. On the other hand, when the controller 30 determines to issue a command for rotor release control to the lock mechanism 20 (Yes in step S101), the controller 30 proceeds to step S102.

In step S102, the controller 30 sets feedback control over the variable transmission ratio mechanism 19 to PD control. After that, the controller 30 proceeds to step S103. In step S103, the controller 30 operates the lock mechanism 20 to execute rotor release control. In subsequent step S104, the controller 30 operates the variable transmission ratio mechanism 19 in order to verify whether the rotor 48 of the variable transmission ratio mechanism 19 is released. At this time, the controller 30 executes feedback control over the variable transmission ratio mechanism 19 so that the actual steered angle coincides with the target steered angle, and the feedback control at this time is PD control. Thus, at this time, even if the rotor 48 is not actually released and is still locked, it is possible to prevent redundant current from flowing through the motor 40. After that, the controller 30 proceeds to step S105.

In step S105, the controller 30 determines whether releasing the rotor 48 by the lock mechanism 20 is complete. For example, the controller 30 determines whether releasing the rotor 48 is complete on the basis of a detection signal from a sensor (not shown) that detects the phase of the rotor 48. Specifically, when the controller 30 has detected rotation of the rotor 48 on the basis of the detection signal, the controller 30 determines that releasing the rotor 48 is complete. On the other hand, when the controller 30 has not detected rotation of the rotor 48 on the basis of the detection signal, the controller 30 determines that releasing the rotor 48 is not complete. When the controller 30 determines that releasing the rotor 48 by the lock mechanism 20 is complete (Yes in step S105), the controller 30 proceeds to step S106. On the other hand, when the controller 30 determines that releasing the rotor 48 by the lock mechanism 20 is not complete (No in step S105), the controller 30 returns to step S103.

In step S106, the controller 30 switches feedback control over the variable transmission ratio mechanism 19 from PD control to PID control. At this time, because it has already been verified in step S105 that releasing the rotor 48 by the lock mechanism 20 is complete, even when feedback control is switched from PD control to PID control, redundant current does not flow through the motor 40. In addition, when the lock mechanism 20 is not operated, PID control is executed over the variable transmission ratio mechanism 19, so the accuracy of control over the variable transmission ratio mechanism 19 may be increased. After that, the controller 30 ends the control process.

With the feedback control switching process shown in FIG. 3, when rotor release control is executed, feedback control is set to PD control until releasing the rotor is complete, so redundant current may be prevented from flowing through the motor 40, and the variable transmission ratio mechanism 19 may be efficiently controlled.

Figure 4:
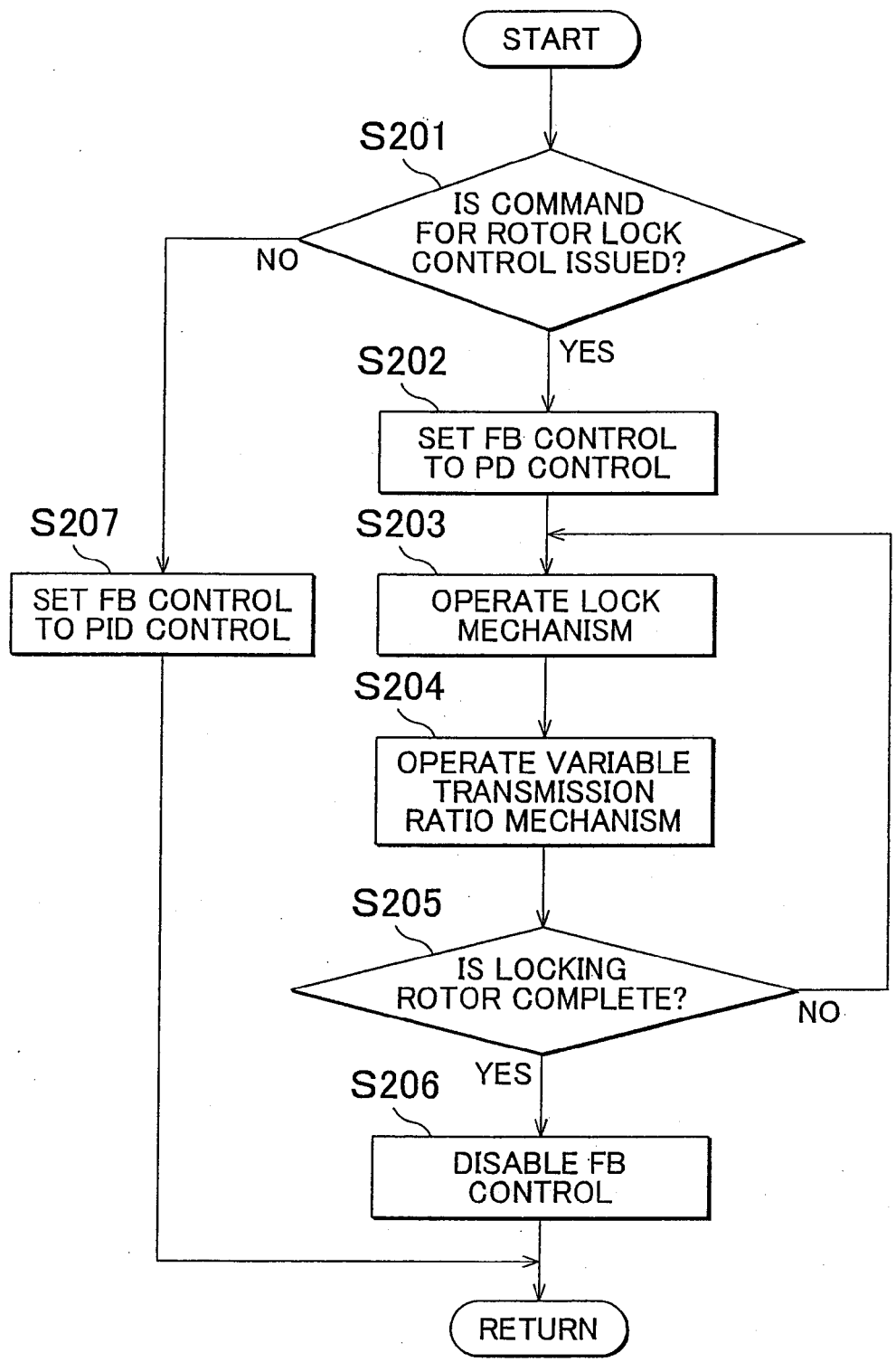
FIG. 4 is a flowchart that shows lock control over the lock mechanism.

Next, the feedback control switching process when rotor lock control is executed will be specifically described using the flowchart shown in FIG. 4.

First, in step S201, the rotor 48 of the variable transmission ratio mechanism 19 is released. Here, the controller 30 determines whether to issue a command for rotor lock control to the lock mechanism 20. For example, when the difference between the actual steered angle and the target steered angle is larger than or equal to a predetermined angle or when a current supplied to the motor 40 is larger than or equal to a predetermined current value, the controller 30 issues a command for rotor lock control to the lock mechanism 20. On the other hand, for example, when the difference between the actual steered angle and the target steered angle is smaller than the predetermined angle and when a current supplied to the motor 40 is smaller than the predetermined current value, the controller 30 does not issue a command for rotor lock control to the lock mechanism 20.

When the controller 30 determines not to issue a command for rotor lock control to the lock mechanism 20 (No in step S201), the controller 30 proceeds to step S207 and then sets feedback control to PID control, after which the controller 30 ends the control process. On the other hand, when the controller 30 determines to issue a command for rotor lock control to the lock mechanism 20 (Yes in step S201), the controller 30 proceeds to step S202.

In step S202, the controller 30 sets feedback control over the variable transmission ratio mechanism 19 to PID control. After that, the controller 30 proceeds to step S203. In step S203, the controller 30 operates the lock mechanism 20 to execute rotor lock control. In subsequent step S204, the controller 30 operates the variable transmission ratio mechanism 19 in order to verify whether the rotor 48 of the variable transmission ratio mechanism 19 is locked. At this time, because feedback control is set to PD control, redundant current does not flow through the motor 40. After that, the controller 30 proceeds to step S205.

In step S205, the controller 30 determines whether locking the rotor 48 by the lock mechanism 20 is complete. Specifically, the controller 30 uses the same method as the method described in step S105 shown in FIG. 3 to determine whether locking the rotor 48 is complete. When the controller 30 determines that locking the rotor 48 by the lock mechanism 20 is complete (Yes in step S205), the controller 30 proceeds to step S206. On the other hand, when the controller 30 determines that releasing the rotor 48 by the lock mechanism 20 is not complete (No in step S205), the controller 30 returns to step S203.

In step S206, the controller 30 disables feedback control over the variable transmission ratio mechanism 19. After that, the controller 30 ends the control process.

With the feedback control switching process shown in FIG. 4, when rotor lock control is executed, feedback control is set to PD control to thereby make it possible to prevent redundant current from flowing through the motor 40, so it is possible to efficiently control the variable transmission ratio mechanism 19.

As is apparent from the above description, in the present embodiment, when the controller 30 executes feedback control over the variable transmission ratio mechanism 19 when the lock mechanism 20 is operated, the controller 30 executes PD control. By so doing, I operation is not executed when the lock mechanism 20 is operated, so redundant current may be prevented from flowing through the motor 40, and the variable transmission ratio mechanism 19 may be efficiently controlled.

Alternative Embodiments

Note that the aspect of the invention is not limited to the embodiment described above; it may be implemented in various forms within the scope of the invention.

For example, in the steering control system 100 according to the above embodiment, when the lock mechanism 20 is operated, feedback control is set to PD control; however, the control method is not limited to this. Instead, feedback control when the lock mechanism 20 is operated may be PID control that has a decreased rate of contribution of I operation as compared with the rate of contribution of I operation when the lock mechanism 20 is not operated. Alternatively, feedback control when the lock mechanism 20 is operated may be P control.

In the steering control system 100 according to the above embodiment, the variable transmission ratio mechanism 19 and the lock mechanism 20 are provided for the steering shaft 2; however, the steering control system to which the aspect of the invention may be applied is not limited to this. Instead, the aspect of the invention may be applied to a steering control system in which a variable transmission ratio mechanism and a lock mechanism are provided for the steering rack 6. In short, as long as a steering control system includes a variable transmission ratio mechanism that varies the transmission ratio between the steering angle and the actual steered angle, the aspect of the invention may be applied to the steering control system.

In addition, in the steering control system 100 according to the above embodiment, when the lock mechanism 20 that serves as the limiting mechanism is operated, the lock mechanism 20 prohibits a relative displacement between the input shaft 2a and the output shaft 2b in the steering shaft 2. However, the variable transmission ratio mechanism to which the aspect of the invention may be applied is not limited to this. Instead of using the lock mechanism 20 that prohibits a relative displacement as the limiting mechanism, a limiting mechanism that limits the amount of relative displacement or the amount of relative rotation between the input shaft 2a and the output shaft 2b may be used. In short, as long as a limiting mechanism suppresses a variation in transmission ratio between the input shaft and the output shaft in the variable transmission ratio mechanism 19, the aspect of the invention may be applied to the limiting mechanism.

In addition, in the steering control system according to the above embodiment, feedback control is disabled while the rotor 48 is completely locked by the lock mechanism 20; however, the steering control system to which the aspect of the invention may be applied is not limited to this. Even while the limiting mechanism is suppressing a relative displacement, feedback control may be continued without disabling the feedback control. In this case, executed feedback control may be, for example, P control, PD control or PID control that has a low rate of contribution of I operation.

The invention claimed is:

1. A steering system that is equipped for a vehicle and that has a variable transmission ratio mechanism that varies a transmission ratio between a steering angle and a steered angle, comprising:

a limiting mechanism that suppresses a variation in the transmission ratio of the variable transmission ratio mechanism; and a control unit that executes feedback control over the variable transmission ratio mechanism, wherein, when the control unit executes feedback control when the limiting mechanism is operated, the control unit decreases a rate of contribution of I operation in the feedback control as compared with a rate of contribution of I operation in the feedback control when the limiting mechanism is not operated.

2. The steering system according to claim 1, wherein the variable transmission ratio mechanism includes a motor that varies the transmission ratio, and the control unit controls a magnitude of current supplied to the motor to control the variable transmission ratio mechanism.

3. The steering system according to claim 1, wherein, when the limiting mechanism is operated, the control unit sets the feedback control to PD control.

4. The steering system according to claim 1, wherein, when the limiting mechanism is not operated, the control unit sets the feedback control to PID control.

5. The steering system according to claim 1, wherein the control unit sets the feedback control to PD control when the control unit verifies through operation of the variable transmission ratio mechanism whether the limiting mechanism is operated or not operated.

6. The steering system according to claim 1, wherein the variable transmission ratio mechanism varies the transmission ratio through a relative displacement between the steering angle and the steered angle, and the limiting mechanism limits an amount of the relative displacement in the variable transmission ratio mechanism to vary the transmission ratio.

7. The steering system according to claim 1, wherein the limiting mechanism is a lock mechanism that prohibits a variation in the transmission ratio in the variable transmission ratio mechanism.

8. The steering system according to claim 7, wherein a time when the limiting mechanism is operated includes a period during which a variation in the transmission ratio in the variable transmission ratio mechanism is prohibited, a period during which control for prohibiting a variation in the transmission ratio is executed and a period during which control for releasing prohibition of a variation in the transmission ratio is executed.

9. The steering system according to claim 1, wherein, when the limiting mechanism is operated, the control unit sets the feedback control to P control.

10. The steering system according to claim 1, wherein, when the limiting mechanism is operated, the control unit sets the feedback control to PID control that has a decreased rate of contribution of I operation.

11. A control method for a steering system that is equipped for a vehicle ant that has a variable transmission ratio mechanism that varies a transmission ratio between a steering angle and a steered angle, comprising:
executing feedback control over the variable transmission ratio mechanism;
executing control for suppressing a variation in the transmission ratio of the variable transmission ratio mechanism on the basis of the steering angle and the steered angle; and
when control for suppressing the transmission ratio is executed, decreasing a rate of contribution of I operation in the feedback control as compared with a rate of contribution of I operation when control for suppressing the transmission ratio is not executed.

* * * * *